(12) United States Patent
Yanagawa et al.

(10) Patent No.: US 10,744,975 B2
(45) Date of Patent: Aug. 18, 2020

(54) WEBBING TAKE-UP DEVICE

(71) Applicant: KABUSHIKI KAISHA TOKAI-RIKA-DENKI-SEISAKUSHO, Aichi (JP)

(72) Inventors: Wataru Yanagawa, Aichi (JP); Shinichi Okubo, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 32 days.

(21) Appl. No.: 16/306,327

(22) PCT Filed: Jun. 8, 2017

(86) PCT No.: PCT/JP2017/021372
§ 371 (c)(1),
(2) Date: Nov. 30, 2018

(87) PCT Pub. No.: WO2017/213238
PCT Pub. Date: Dec. 14, 2017

(65) Prior Publication Data
US 2019/0308585 A1 Oct. 10, 2019

(30) Foreign Application Priority Data

Jun. 9, 2016 (JP) .................................. 2016-115590

(51) Int. Cl.
*B60R 22/46* (2006.01)
(52) U.S. Cl.
CPC ........ *B60R 22/46* (2013.01); *B60R 2022/468* (2013.01)
(58) Field of Classification Search
CPC ........................ B60R 22/46; B60R 2022/468
See application file for complete search history.

(56) References Cited

U.S. PATENT DOCUMENTS 6,616,081 B1 * 9/2003 Clute .................. B60R 22/3413
242/379.1
8,740,125 B2 * 6/2014 Ogawa ................ B60R 22/4628
242/379.1
(Continued)

FOREIGN PATENT DOCUMENTS

JP 2002-503168 A 1/2002
JP 2014-008920 A 1/2014
(Continued)

OTHER PUBLICATIONS

International Search Report and Written Opinion issued in corresponding International Application No. PCT/JP2017/021372 dated Sep. 12, 2017.

*Primary Examiner* — Sang K Kim
(74) *Attorney, Agent, or Firm* — Roberts Calderon Safran & Cole P.C.

(57) ABSTRACT

Provided is a webbing take-up device including (i) a spool onto which webbing worn by an occupant is taken up as a result of the spool being rotated in a take-up direction, (ii) a rotating body that is provided so as to be integrally rotatable with the spool, has plural teeth disposed an interval apart from each other along a circumferential direction of rotation of the spool, and is rotated as a result of a moving member being moved and becoming engaged with the plural teeth so that the spool is rotated in the take-up direction, and (iii) a regulating portion that opposes the plural teeth in an axial direction of rotation of the spool, is provided so as to be integrally rotatable with the rotating body, and regulates movement, in a direction away from the plural teeth, of the moving member engaged with the plural teeth.

4 Claims, 3 Drawing Sheets

(56) References Cited

U.S. PATENT DOCUMENTS

| | | | |
|---|---|---|---|
| 2005/0178870 A1* | 8/2005 | Loffler | B60R 22/405 |
| | | | 242/374 |
| 2009/0218803 A1* | 9/2009 | Friedsmann | B60R 22/4628 |
| | | | 280/807 |
| 2010/0176236 A1* | 7/2010 | Clute | B60R 22/3413 |
| | | | 242/394 |
| 2014/0145020 A1 | 5/2014 | Gentner et al. | |
| 2015/0144727 A1 | 5/2015 | Nakayama et al. | |

FOREIGN PATENT DOCUMENTS

| | | |
|---|---|---|
| JP | 2014-500178 A | 1/2014 |
| WO | 2017/069047 A1 | 4/2017 |

* cited by examiner

WEBBING TAKE-UP DEVICE

CROSS-REFERENCE TO RELATED APPLICATIONS

The present application is a U.S. National Phase of PCT/JP2017/021372 filed on Jun. 8, 2017, claiming priority to Japanese Patent Application No. 2016-115590 filed Jun. 9, 2016. The disclosure of the PCT Application is hereby incorporated by reference into the present Application.

TECHNICAL FIELD

The present disclosure relates to a webbing take-up device.

BACKGROUND ART

JP-A No. 2002-503168 and JP-A No. 2014-500178 disclose webbing take-up devices equipped with a pretensioner mechanism that causes webbing to be taken up onto a spool by causing the spool to rotate in a take-up direction at the time of a vehicle emergency. In the pretensioner mechanism disclosed in these documents, a moving member that has been moved by the activation of a gas generator becomes engaged with plural teeth disposed an interval apart from each other in the circumferential direction of rotation of the spool, whereby the webbing can be taken up onto the spool.

In this connection, in terms of efficiently transmitting to the spool the kinetic energy of the moving member that has been moved by the activation of the gas generator, inhibiting the moving member from moving in a direction away from the plural teeth when the moving member becomes engaged with the plural teeth is essential.

SUMMARY OF INVENTION

Technical Problem

The present disclosure obtains a webbing take-up device that can inhibit the moving member from moving in a direction away from the plural teeth.

Solution to Problem

A first aspect of the present disclosure is a webbing take-up device including (i) a spool onto which webbing worn by an occupant is taken up as a result of the spool being rotated in a take-up direction, (ii) a rotating body that is provided so as to be integrally rotatable with the spool, has plural teeth disposed an interval apart from each other along a circumferential direction of rotation of the spool, and is rotated as a result of a moving member being moved and becoming engaged with the plural teeth so that the spool is rotated in the take-up direction, (iii) and a regulating portion that opposes the plural teeth in an axial direction of rotation of the spool, is provided so as to be integrally rotatable with the rotating body, and regulates movement, in a direction away from the plural teeth, of the moving member engaged with the plural teeth.

According to the first aspect, the rotating body is rotated as a result of the moving member becoming engaged with the plural teeth of the rotating body. Because of this, the spool is rotated in the take-up direction and the webbing is taken up onto the spool. Here, in the first aspect, the webbing take-up device is provided with the regulating portion that opposes the plural teeth in the axial direction of rotation of the spool and is integrally rotatable with the rotating body. Because the webbing take-up device has this regulating portion, the moving member engaged with the plural teeth can be inhibited from moving away in the axial direction of rotation of the spool from the plural teeth.

A second aspect of the present disclosure is the webbing take-up device of the first aspect, wherein the rotating body includes a first rotating body and a second rotating body that have the plural teeth, the phase of the plural teeth of the first rotating body and the phase of the plural teeth of the second rotating body are disposed shifted from each other in the circumferential direction of rotation of the spool, and the regulating portion includes a first regulating portion that regulates movement, toward the first rotating body, of the moving member engaged with the plural teeth of the second rotating body and a second regulating portion that regulates movement, toward the second rotating body, of the moving member engaged with the plural teeth of the first rotating body.

According to the second aspect, the first rotating body and the second rotating body are rotated as a result of the moving member becoming engaged with the plural teeth of the first rotating body and the plural teeth of the second rotating body. Because of this, the spool is rotated in the take-up direction and the webbing is taken up onto the spool. Here, in the second aspect, movement, toward the first rotating body, of the moving member engaged with the plural teeth of the second rotating body is regulated by the first regulating portion, and movement, toward the second rotating body, of the moving member engaged with the plural teeth of the first rotating body is regulated by the second regulating portion. Because of this, according to the second aspect, the moving member can be inhibited from moving between the first rotating body and the second rotating body in a direction away from the plural teeth of both.

A third aspect of the present disclosure is the webbing take-up device of the second aspect, wherein the plural teeth of the first rotating body and the plural teeth of the second rotating body are disposed alternating with each other in the circumferential direction of rotation of the spool, and intervals between the teeth of the first rotating body and the teeth of the second rotating body adjacent to each other in the circumferential direction of rotation of the spool are set at equal intervals.

According to the third aspect, the intervals between the teeth of the first rotating body and the teeth of the second rotating body adjacent to each other in the circumferential direction of rotation of the spool are set at equal intervals. Because of this, the fluctuation range of the torque that acts on the first rotating body and the second rotating body as a result of the moving member becoming engaged with the plural teeth of the first rotating body and the plural teeth of the second rotating body can be reduced.

A fourth aspect of the present disclosure is the webbing take-up device of the second or third aspect, wherein the shapes of the plural teeth of the first rotating body and the shapes of the plural teeth of the second rotating body are formed symmetrically across a line orthogonal to the axial direction of rotation of the spool.

According to the fourth aspect, the shapes of the plural teeth of the first rotating body and the shapes of the plural teeth of the second rotating body are formed symmetrically across a line orthogonal to the axial direction of rotation of the spool. Because of this, the stress that acts on the teeth of each of the first rotating body and the second rotating body as a result of the moving member becoming engaged with the plural teeth of the first rotating body and the plural teeth of the second rotating body can be made uniform.

A fifth aspect of the present disclosure is the webbing take-up device of the second to fourth aspects, wherein at least parts of the plural teeth of the first rotating body and at least parts of the plural teeth of the second rotating body are disposed overlapping each other in the circumferential direction of rotation of the spool.

According to the fifth aspect, at least parts of the plural teeth of the first rotating body and at least parts of the plural teeth of the second rotating body are disposed overlapping each other in the circumferential direction of rotation of the spool. Because of this, the teeth of the first rotating body that have become deformed as a result of the moving member becoming engaged with them can be supported by the teeth of the second rotating body that are disposed adjacent in the circumferential direction of rotation of the spool to the teeth of the first rotating body, and the teeth of the second rotating body that have become deformed as a result of the moving member becoming engaged with them can be supported by the teeth of the first rotating body that are disposed adjacent in the circumferential direction of rotation of the spool to the teeth of the second rotating body. As a result, according to the fifth aspect, it becomes possible for the thickness of the teeth of the first rotating body and the teeth of the second rotating body to be set thin.

DESCRIPTION OF EMBODIMENT

Figure 1:
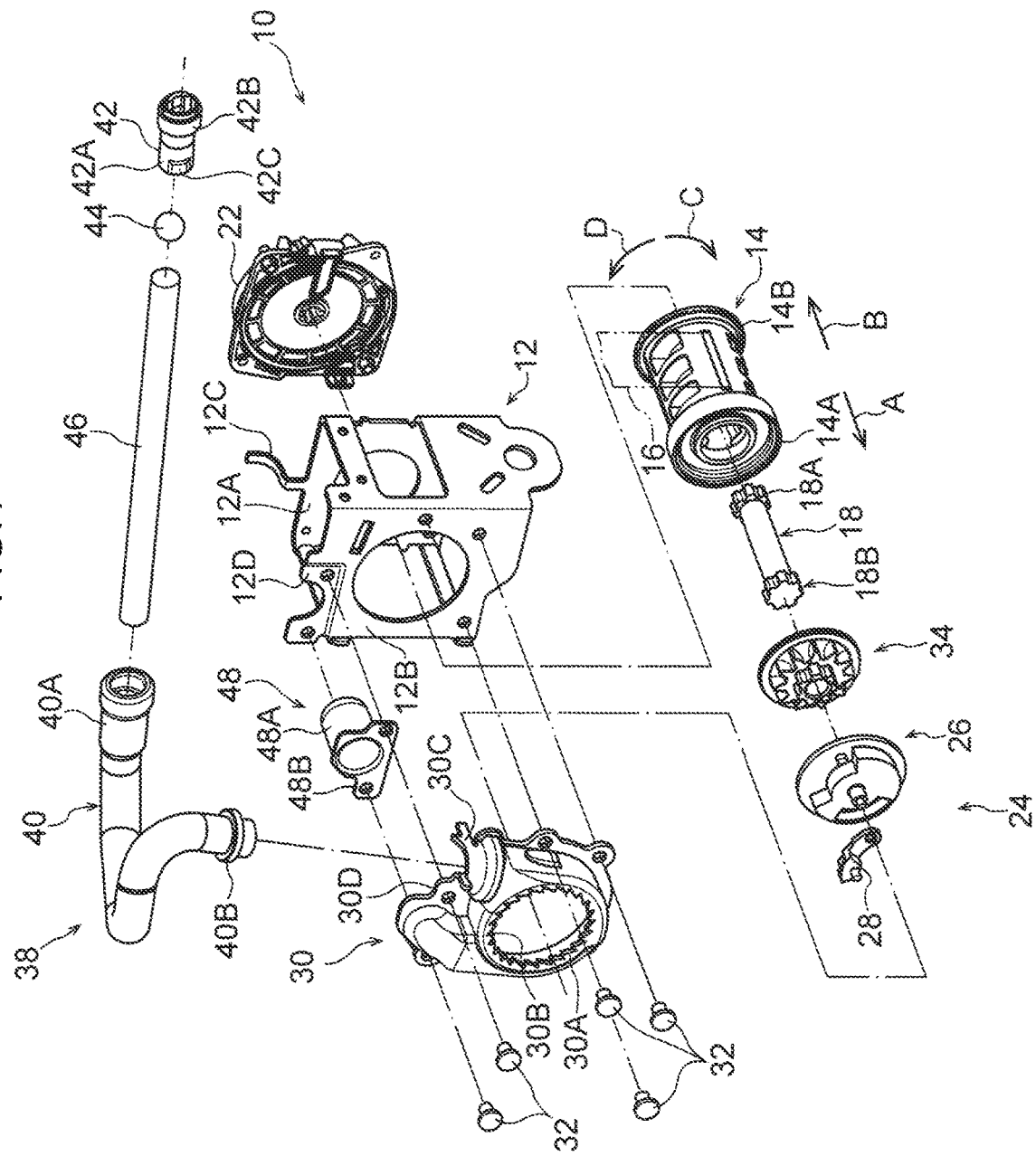
FIG. 1 is an exploded perspective view showing a webbing take-up device.

A webbing take-up device pertaining to an embodiment of the present disclosure will be described using FIG. 1 to FIG. 5. It will be noted that in the drawings arrow A indicates one side in an axial direction of rotation of a spool 14 in a webbing take-up device 10 and arrow B indicates the other side in the axial direction of rotation of the spool 14. Furthermore, hereinafter when referring simply to an axial direction, a radial direction, and a circumferential direction, unless otherwise specified these will refer to the axial direction of rotation, the radial direction of rotation, and the circumferential direction of rotation of the spool 14.

As shown in FIG. 1, the webbing take-up device 10 is equipped with a frame 12. The frame 12 is secured to a pillar configuring a vehicle body frame of a vehicle or a seat cushion frame configuring a frame of a vehicle seat. Furthermore, the frame 12 is equipped with leg plates 12A and 12B, and the leg plate 12A and the leg plate 12B oppose each other in the axial direction of the spool 14.

A spool 14 substantially in the shape of a hollow cylinder is provided in the frame 12. The direction of the central axis of the spool 14 lies along the direction in which the leg plate 12A and the leg plate 12B oppose each other, and the spool 14 is rotatable about the central axis. A longitudinal direction base end portion of webbing 16 formed in the shape of a long band is anchored to the spool 14, and the webbing 16 is taken up from the longitudinal direction base end side onto the spool 14 as a result of the spool 14 being rotated in a take-up direction (the direction of arrow C). Furthermore, a longitudinal direction distal end side of the webbing 16 extends in the vehicle upward direction from the spool 14, and the longitudinal direction distal end side of the webbing 16 is looped back in the vehicle downward direction through a slit hole formed in a through anchor (not shown in the drawings) on the vehicle upper side of the frame 12.

The longitudinal direction distal end portion of the webbing 16 is anchored to an anchor plate (not shown in the drawings). The anchor plate is formed by a metal plate such as steel and is secured to a floor (not shown in the drawings) of the vehicle or a frame member of the seat (not shown in the drawings) corresponding to the webbing take-up device 10.

Furthermore, a vehicle seat belt device to which the webbing take-up device 10 is applied is equipped with a buckle device (not shown in the drawings). The buckle device is provided on the vehicle width direction inner side of the seat to which the webbing take-up device 10 is applied. The webbing 16 is worn on the body of an occupant sitting in the seat by causing a tongue (not shown in the drawings) provided on the webbing 16 to engage with the buckle device in a state in which the webbing 16 has been pulled around the body of the occupant.

A spring housing 22 is provided on the outer surface side (outside the frame 12) of the leg plate 12A of the frame 12. A spool biasing means (not shown in the drawings) such as a flat coil spring is provided inside the spring housing 22, and the spool 14 is biased in the take-up direction (the direction of arrow C) of the webbing 16 by the biasing force of the spool biasing means.

A lock mechanism 24 is provided on the outer surface side (outside the frame 12) of the leg plate 12B of the frame 12. The lock mechanism 24 is equipped with a lock base 26 serving as a rotating body and a first rotating body. The lock base 26 is provided on the one side (the directional side of arrow A) in the axial direction of the spool 14, is coaxial and relatively rotatable with the spool 14, and is rotatable about the central axis of the spool 14 as a result of the rotational force of the spool 14 being transmitted thereto. The lock base 26 in the present embodiment is die-cast. Furthermore, the lock mechanism 24 is equipped with a sensor mechanism (not shown in the drawings). The sensor mechanism is activated at the time of a vehicle emergency such as at the time of an impact to the vehicle. When the sensor mechanism is activated, a lock pawl 28 serving as a lock means provided on the lock base 26 is moved outward in the radial direction of the lock base 26.

Furthermore, a cover plate 30 is secured by rivets 32 to the leg plate 12B of the frame 12. The cover plate 30 is recessed toward the opposite side of the frame 12 side and is equipped with a plate portion 30A. The plate portion 30A of the cover plate 30 is disposed so as to oppose the leg plate 12B on the outer surface side (outside the frame 12) of the leg plate 12B of the frame 12.

A ratchet hole 30B serving as a lock means is formed through the plate portion 30A of the cover plate 30, and the lock base 26 of the lock mechanism 24 penetrates the ratchet hole 30B of the cover plate 30. When the sensor mechanism of the lock mechanism 24 is activated and the lock pawl 28 of the lock base 26 is moved outward in the radial direction of the lock base 26, the lock pawl 28 meshes with ratchet teeth of the ratchet hole 30B in the cover plate 30. Because of this, at the time of a vehicle emergency, rotation of the lock base 26 in a pull-out direction (the direction of arrow D) opposite the take-up direction is limited.

Furthermore, the webbing take-up device 10 is equipped with a torsion shaft 18 configuring a force limiter. The torsion shaft 18 is formed in the shape of a rod, is housed in an axial center portion of the spool 14, and is disposed along the axial direction of the spool 14. A first end portion 18A in the axial direction of the torsion shaft 18 is retained in the spool 14 in a state in which relative rotation with respect to the spool 14 is deterred at the side of another axial direction end portion 14B (other end side from one axial direction end portion 14A) of the spool 14. A second end portion 18B in the axial direction of the torsion shaft 18 is connected to the lock base 26 via a coupling member 34 described below.

The coupling member 34, which serves as a rotating body and a second rotating body disposed between the lock base 26 and the torsion shaft 18, is secured to the lock base 26 and is secured to the torsion shaft 18. Because of this, relative rotation of the torsion shaft 18 with respect to the lock base 26 is deterred, and the lock base 26 is connected to the spool 14 in a state in which relative rotation with respect to the spool 14 is deterred by the coupling member 34 and the torsion shaft 18.

The webbing take-up device 10 is equipped with a pretensioner mechanism 38. The pretensioner mechanism 38 is equipped with a pipe 40 (a tubular member). The pipe 40 is formed substantially in the shape of a hollow cylinder overall and has plural bent portions. An axial direction base end portion of the pipe 40 is configured to serve as a micro gas generator attachment portion 40A serving as a gas generator attachment portion. The micro gas generator attachment portion 40A is supported by a support portion 12C provided on the upper end side of the leg plate 12A of the frame 12. A micro gas generator 42 serving as a gas generator is attached to the micro gas generator attachment portion 40A.

The micro gas generator 42 is equipped with a gas generant housing portion 42A, which is in the shape of a bottomed hollow cylinder and is filled with a gas generant, and an igniter housing portion 42B, which is equipped with an igniter that generates heat when current is passed therethrough and to which a wire connector provided in the vehicle is connected. Additionally, when the gas generant filling the inside of the gas generant housing portion 42A is ignited as a result of the igniter generating heat and the gas generant burns, high-pressure gas is instantaneously generated. Furthermore, the pressure of the gas generated inside the gas generant housing portion 42A causes the gas generant housing portion 42A to expandingly deform and thereafter rupture, and high-temperature high-pressure gas flowing out from the gas generant housing portion 42A is supplied to the inside of the pipe 40. Furthermore, in the present embodiment, most of the outer peripheral surface of the gas generant housing portion 42A is formed substantially in the shape of a hollow cylinder surface. Furthermore, in the distal end portion (the portion on the opposite side of the igniter housing portion 42B) of the gas generant housing portion 42A, a pair of flat surface portions 42C are formed as a result of parts of the distal end portion of the gas generant housing portion 42A being deformed.

An axial direction distal end portion of the pipe 40 is configured to serve as a cover plate attachment portion 40B whose open portion faces downward. The cover plate attachment portion 40B is attached to a pipe attachment portion 30C provided in the upper portion of the cover plate 30 and is disposed more inward in the vehicle width direction (more on the near side in the drawing) than the central axis of the spool 14.

The pretensioner mechanism 38 is equipped with a rack 46 serving as a moving member. The rack 46 is made of synthetic resin and is formed in the shape of a rod by a softer material than that of the lock base 26 and the coupling member 34. Additionally, the rack 46 is disposed inside the pipe 40. It should be noted that a seal ball 44 is disposed inside the pipe 40 between the rack 46 and the micro gas generator 42. The rack 46 is moved inside the pipe 40 and inside the cover plate 30 (i.e., on the one side in the axial direction of the spool 14) by the pressure of the gas supplied from the micro gas generator 42 at the time of a vehicle emergency.

Furthermore, a stopper attachment portion 30D is provided in the upper portion of the cover plate 30 on the vehicle width direction outer side (the far side in the drawing) of the pipe attachment portion 30C. Moreover, a stopper attachment portion 12D is provided in the upper portion of the leg plate 12B of the frame 12 in a portion thereof opposing the stopper attachment portion 30D of the cover plate 30. A flange portion 48B of a rack stopper 48 is disposed between the stopper attachment portion 30D of the cover plate 30 and the stopper attachment portion 12D of the frame 12, and the flange portion 48B is jointly fastened by the rivets 32. A body portion 48A of the rack stopper 48 is formed in the shape of a bottomed tube, with the open portion facing the cover plate 30 side, and limits movement of the rack 46 that has moved inside the cover plate 30.

Next, the configurations of the details of the lock base 26 and the coupling member 34 that are the main portions of the present embodiment will be described.

Figure 2:
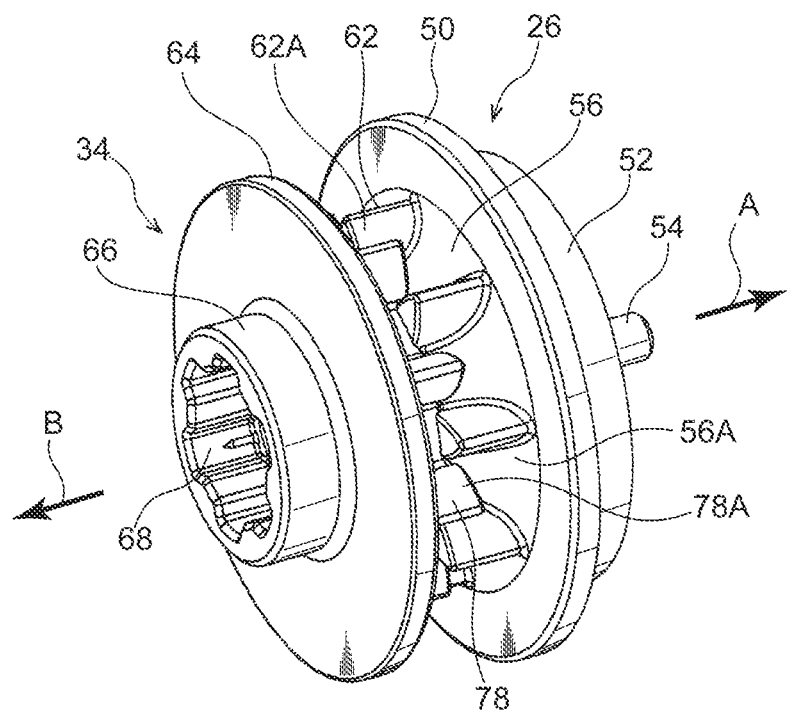
FIG. 2 is a perspective view showing an integrated lock base and coupling member.

As shown in FIG. 2, the lock base 26 and the coupling member 34 are integrally rotatable as a result of being combined with each other.

Figure 3:
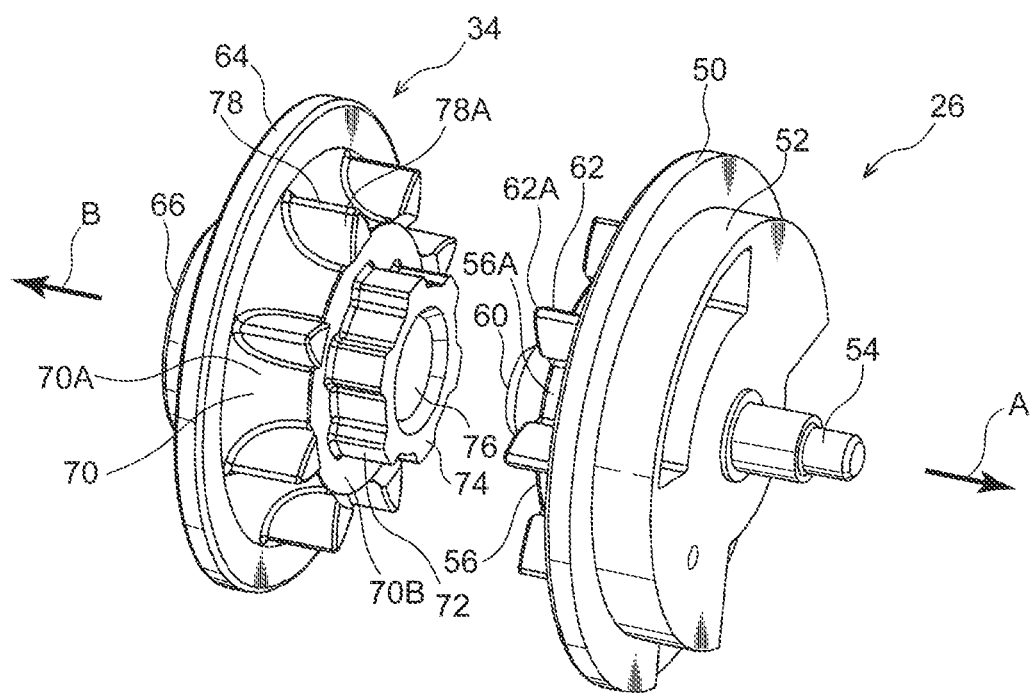
FIG. 3 is an exploded perspective view showing the lock base and the coupling member.

As shown in FIG. 3, the lock base 26 is equipped with a lock base flange portion 50 serving as a regulating portion and a first regulating portion formed in the shape of a disc whose thickness direction coincides with the axial direction. Furthermore, the lock base 26 is equipped with a solid cylinder portion 52 substantially in the shape of a solid cylinder that projects toward the one side in the axial direction from the lock base flange portion 50 and from which a portion where the aforementioned lock pawl 28 (see FIG. 1) is disposed is cut out. A shaft portion 54 in the shape of a rod projects toward the one side in the axial direction from the axial center portion of the solid cylinder portion 52. Additionally, the shaft portion 54 is supported by a spindle portion not shown in the drawings.

Figure 4:
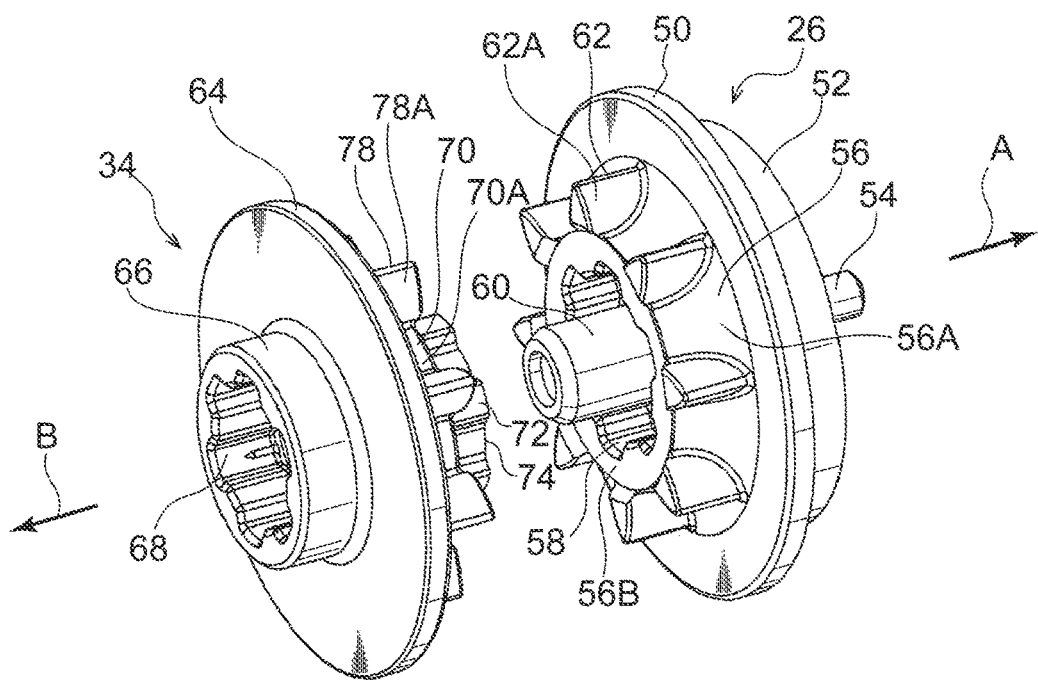
FIG. 4 is an exploded perspective view of the lock base and the coupling member as seen from the opposite side of FIG. 3.

As shown in FIG. 4, the lock base 26 is equipped with a lock base tubular portion 56, which projects toward the other side in the axial direction from the lock base flange portion 50 and is formed in such a way that the outer diameter of a radial direction outer surface 56A becomes smaller heading toward the other side in the radial direction. A lock base spline 58 in the shape of a spline is formed in the inner peripheral portion of the lock base tubular portion 56. It will be noted that a lock base core portion 60 formed in the shape of a tube larger in diameter than the shaft portion 54 is provided in the axial center portion of the lock base tubular portion 56. Furthermore, plural lock base engagement teeth 62 serving as plural teeth disposed a predetermined interval apart from each other in the circumferential direction are provided on the outer peripheral portion of the lock base tubular portion 56. The height (the height outward in the radial direction from the radial direction outer surface 56A of the lock base tubular portion 56) of the lock base engagement teeth 62 becomes higher heading toward the other side in the axial direction. Furthermore, the thickness (the dimension in the circumferential direction) of the lock base engagement teeth 62 is set so as to become smaller heading outward in the radial direction. Furthermore, the width (the dimension in the axial direction) of the lock base engagement teeth 62 is set in such a way that end portions 62A of the lock base engagement teeth 62 on the other side in the axial direction are disposed more on the other side in the axial direction than an end surface 56B of the lock base tubular portion 56 on the other side in the axial direction.

The coupling member 34 is equipped with a coupling member flange 64 serving as a regulating portion and a second regulating portion formed in the shape of a disc whose thickness direction coincides with the axial direction. Furthermore, the coupling member 34 is equipped with a torsion shaft engagement portion 66 formed in the shape of a hollow cylinder that projects toward the other side in the axial direction from the coupling member flange 64. A torsion shaft engagement spline 68 in the shape of a spline with which the second end portion 18B of the torsion shaft 18 (see FIG. 1) is engaged is formed in the inner peripheral portion of the torsion shaft engagement portion 66.

Figure 5:
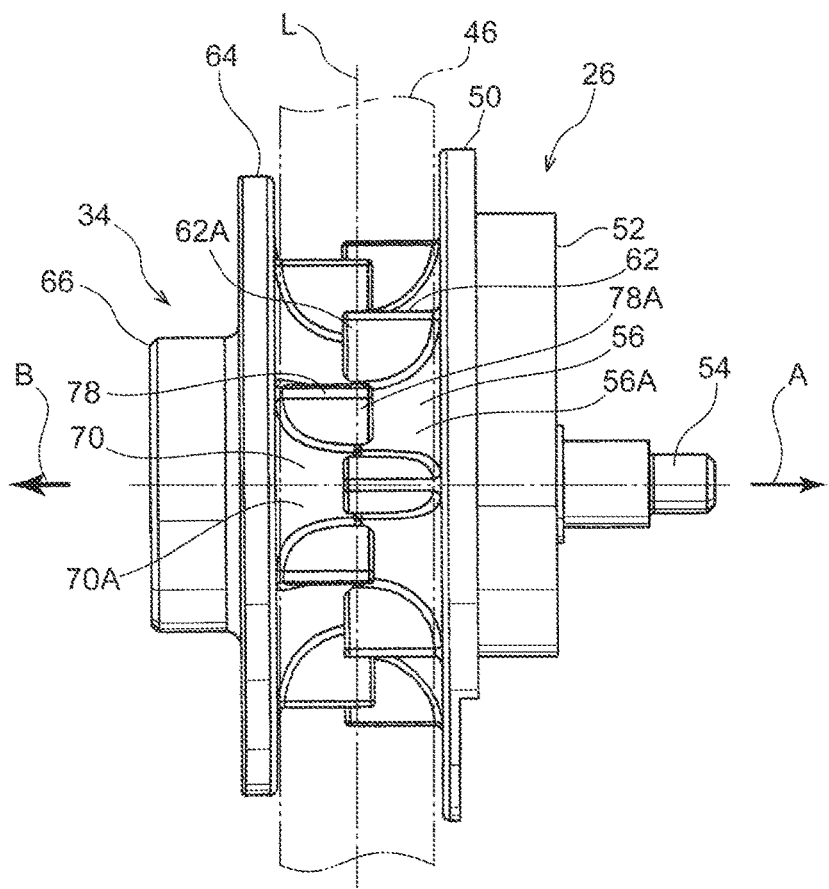
FIG. 5 is a side view showing the integrated lock base and coupling member.

As shown in FIG. 3, the coupling member 34 is equipped with a coupling member tubular portion 70, which projects toward the one side in the axial direction from the coupling member flange 64 and is formed in such a way that the outer diameter of a radial direction outer surface 70A becomes smaller heading toward the one side in the axial direction. A coupling member core portion 74, in which is formed a coupling member spline 72 in the shape of a spline that projects toward the one side in the axial direction and is engaged at its outer peripheral portion ith the lock base spline 58 of the lock base 26 (see FIG. 4), is provided in the inner peripheral portion of the coupling member tubular portion 70. It will be noted that an insertion hole 76 into which the lock base core portion 60 of the lock base 26 is inserted is formed in the axial center portion of the coupling member core portion 74. Additionally, the lock base core portion 60 of the lock base 26 is inserted into the insertion hole 76 in the coupling member core portion 74, and the coupling member spline 72 becomes engaged with the lock base spline 58, whereby the lock base 26 and the coupling member 34 are integrally rotatably combined with each other. Furthermore, as shown in FIG. 5, in a state in which the coupling member spline 72 is engaged with the lock base spline 58, an end surface 70B (see FIG. 3) of the coupling member tubular portion 70 of the coupling member 34 on the one side in the axial direction and the end surface 56B (see FIG. 4) of the lock base tubular portion 56 of the lock base 26 on the other side in the axial direction are in abutting contact with each other.

As shown in FIG. 3, plural coupling member engagement teeth 78 serving as plural teeth disposed a predetermined interval apart from each other in the circumferential direction are provided on the outer peripheral portion of the coupling member tubular portion 70. The height (the height outward in the radial direction from the radial direction outer surface 70A of the coupling member tubular portion 70) of the coupling member engagement teeth 78 becomes higher heading toward the one side in the axial direction. Furthermore, the thickness (the dimension in the circumferential direction) of the coupling member engagement teeth 78 is set so as to become smaller heading outward in the radial direction. Furthermore, the width (the dimension in the axial direction) of the coupling member engagement teeth 78 is set in such a way that end portions 78A of the coupling member engagement teeth 78 on the one side in the axial direction are disposed more on the one side in the axial direction than the end surface 70B of the coupling member tubular portion 70 on the one side in the axial direction. Furthermore, in the present embodiment, the numbers of teeth, the pitches in the circumferential direction, and the pitch circle diameters of the plural coupling member engagement teeth 78 and the plural lock base engagement teeth 62 are identically set. Furthermore, the height, the thickness, and the width of the coupling member engagement teeth 78 are set identical to the height, the thickness, and the width of the lock base engagement teeth 62. Moreover, the shape of the coupling member engagement teeth 78 and the shape of the lock base engagement teeth 62 are formed symmetrically across a line orthogonal to the axial direction (a line extending in the radial direction). Specifically, as shown in FIG. 5, the shape of the coupling member engagement teeth 78 and the shape of the lock base engagement teeth 62 are symmetrically formed across a bisector line L that bisects in the axial direction the space between the lock base flange portion 50 of the lock base 26 and the coupling member flange 64 of the coupling member 34.

Furthermore, in a state in which the lock base 26 and the coupling member 34 are combined with each other, the coupling member engagement teeth 78 and the lock base engagement teeth 62 are disposed alternating with each other in the circumferential direction and are disposed at equal intervals. Furthermore, in this state, the end portions 78A of the coupling member engagement teeth 78 on the one side in the axial direction and the end portions 62A of the lock base engagement teeth 62 on the other side in the axial direction are disposed overlapping each other in the circumferential direction and in close proximity to each other.

Operation of Present Embodiment

Next, the operation of the present embodiment will be described.

As shown in FIG. 1, according to the webbing take-up device 10 of the present embodiment, at the time of an impact to the vehicle, which is one aspect of at the time of a vehicle emergency, when the lock pawl 28 meshes with the ratchet teeth of the ratchet hole 30B, rotation of the lock base 26 in the pull-out direction (the direction of arrow D) is limited. Furthermore, when the micro gas generator 42 is activated by an ECU at the time of an impact to the vehicle, the high-pressure gas generated by the micro gas generator 42 is instantaneously supplied to the inside of the pipe 40. The pressure of the gas causes the rack 46 inside the pipe 40 to move, and the rack 46 is discharged from the axial direction distal end side of the pipe 40. Then, when the discharged rack 46 becomes engaged with and pushes against the coupling member engagement teeth 78 of the coupling member 34 (see FIG. 5, etc.) and the lock base engagement teeth 62 of the lock base 26 (see FIG. 5, etc.), the coupling member 34 and the lock base 26 are rotated in the take-up direction (the direction of arrow C) together with the spool 14. Because of this, the webbing 16 is taken up onto the spool 14 and the force with which the occupant is restrained by the webbing 16 is increased.

Here, as shown in FIG. 5, according to the webbing take-up device 10 of the present embodiment, movement, in the axial direction toward the lock base 26, of the rack 46 engaged with the plural coupling member engagement teeth 78 of the coupling member 34 is regulated by the lock base flange portion 50, and movement, in the axial direction toward the coupling member 34, of the rack 46 engaged with the plural lock base engagement teeth 62 of the lock base 26 is regulated by the coupling member flange 64. In this way, in the present embodiment, the rack 46 can be inhibited from moving between the lock base 26 and the coupling member 34 in a direction away from the plural teeth (the coupling member engagement teeth 78 and the lock base engagement teeth 62) of both.

Furthermore, in the present embodiment, the intervals between the lock base engagement teeth 62 of the lock base 26 and the coupling member engagement teeth 78 of the coupling member 34 adjacent to each other in the circumferential direction are set at equal intervals. Because of this, the fluctuation range of the torque that acts on the lock base 26 and the coupling member 34 as a result of the rack 46 becoming engaged with the plural lock base engagement teeth 62 of the lock base 26 and the plural coupling member engagement teeth 78 of the coupling member 34 can be reduced, and fluctuations in the force with which the webbing 16 is taken up onto the spool 14 by the rack 46 can be inhibited.

Moreover, in the present embodiment, the shapes of the plural lock base engagement teeth 62 of the lock base 26 and the shapes of the plural coupling member engagement teeth 78 of the coupling member 34 are formed symmetrically across a line orthogonal to the axial direction of rotation of the spool 14. Because of this, the stress that acts on the teeth of each of the lock base 26 and the coupling member 34 as a result of the rack 46 becoming engaged with the plural lock base engagement teeth 62 of the lock base 26 and the plural coupling member engagement teeth 78 of the coupling member 34 can be made uniform. Furthermore, displacement of the lock base 26 and the coupling member 34 in the axial direction can be inhibited. Moreover, the extension dimension of the lock base engagement teeth 62 toward the coupling member 34 and the extension dimension of the coupling member engagement teeth 78 toward the rack 46 can be made uniform, and a situation where one of the extension dimensions becomes greater such that the strength of the lock base engagement teeth 62 or the coupling member engagement teeth 78 becomes lower can be inhibited.

Furthermore, in the present embodiment, the end portions 62A of the plural lock base engagement teeth 62 of the lock base 26 on the other side in the axial direction and the end portions 78A of the plural coupling member engagement teeth 78 of the coupling member 34 on the one side in the axial direction are disposed overlapping each other in the circumferential direction. Because of this, the lock base engagement teeth 62 of the lock base 26 that have become deformed as a result of the rack 26 becoming engaged with them can be supported by the coupling member engagement teeth 78 of the coupling member 34 that are disposed adjacent in the circumferential direction to the lock base engagement teeth 62, and the coupling member engagement teeth 78 of the coupling member 34 that have become deformed as a result of the rack 46 becoming engaged with them can be supported by the lock base engagement teeth 62 of the lock base 26 that are disposed adjacent in the circumferential direction to the coupling member engagement teeth 78. As a result, it becomes possible for the thickness of the lock base engagement teeth 62 of the lock base 26 and the coupling member engagement teeth 78 of the coupling member 34 to be set thin, and the deformation margin (volume) in which the rack 46 becomes deformed as a result of becoming engaged with the lock base engagement teeth 62 of the lock base 26 and the coupling member engagement teeth 78 of the coupling member 34 can be reduced. Because of this, the kinetic energy of the rack 46 can be efficiently transmitted to the lock base 26 and the coupling member 34.

It will be noted that although in the present embodiment an example has been described where the plural teeth (the coupling member engagement teeth 78 and the lock base engagement teeth 62) with which the rack 46 becomes engaged are provided on both the lock base 26 and the coupling member 34, the present disclosure is not limited to this. For example, the webbing take-up device may also be given a configuration not provided with the coupling member engagement teeth 78 of the coupling member 34. In this case, movement, in the axial direction toward the coupling member 34, of the rack 46 engaged with the plural lock base engagement teeth 62 of the lock base 26 is regulated by the coupling member flange 64, whereby the engaged state between the rack 46 and the plural lock base engagement teeth 62 can be maintained. Furthermore, the webbing take-up device may also be given a configuration not provided with the lock base engagement teeth 62 of the lock base 26. In this case, movement, in the axial direction toward the lock base 26, of the rack 46 engaged with the plural coupling member engagement teeth 78 of the coupling member 34 is regulated by the lock base flange portion 50, whereby the engaged state between the rack 46 and the plural coupling member engagement teeth 78 can be maintained.

Furthermore, in the present embodiment, an example has been described where the lock base engagement teeth 62 of the lock base 26 and the coupling member engagement teeth 78 of the coupling member 34 are disposed alternating with each other in the circumferential direction, but the present disclosure is not limited to this. For example, the lock base engagement teeth 62 of the lock base 26 and the coupling member engagement teeth 78 of the coupling member 34 may also be disposed in the same positions in the circumferential direction.

Moreover, in the present embodiment, an example has been described where the end portions 62A of the plural lock base engagement teeth 62 of the lock base 26 on the other side in the axial direction and the end portions 78A of the plural coupling member engagement teeth 78 of the coupling member 34 on the one side in the axial direction are made to overlap each other in the circumferential direction, but the present disclosure is not limited to this. For example, the webbing take-up device may also be given a configuration where the entireties of the plural lock base engagement teeth 62 of the lock base 26 and the entireties of the plural coupling member engagement teeth 78 of the coupling member 34 are made to overlap each other in the circumferential direction. Furthermore, the webbing take-up device may also be given a configuration where the plural lock base engagement teeth 62 of the lock base 26 and the plural coupling member engagement teeth 78 of the coupling member 34 are not made to overlap each other in the circumferential direction. Whether or not to make the plural lock base engagement teeth 62 of the lock base 26 and the plural coupling member engagement teeth 78 of the coupling member 34 overlap each other in the circumferential direction may be appropriately set in consideration of, for example, the thickness of the lock base engagement teeth 62 and the coupling member engagement teeth 78.

An embodiment of the present disclosure has been described above, but the present disclosure is not limited to what is described above and can of course be modified and implemented in a variety of ways, in addition to what is described above, in a range that does not depart from the spirit thereof.

The disclosure of Japanese Patent Application No. 2016-115590 is incorporated in its entirety by reference herein.

All documents, patent applications, and technical standards mentioned in this specification are incorporated by reference herein to the same extent as if each individual document, patent application, or technical standard were specifically and individually indicated to be incorporated by reference.

The invention claimed is:

1. A webbing take-up device comprising:
a spool onto which webbing worn by an occupant is taken up as a result of the spool being rotated in a take-up direction;
a rotating body that is provided so as to be integrally rotatable with the spool, has plural teeth disposed an interval apart from each other along a circumferential direction of rotation of the spool, and is rotated as a result of a moving member being moved and becoming engaged with the plural teeth so that the spool is rotated in the take-up direction; and
a regulating portion that opposes the plural teeth in an axial direction of rotation of the spool, is provided so as to be integrally rotatable with the rotating body, and regulates movement, in a direction away from the plural teeth, of the moving member engaged with the plural teeth,
wherein the rotating body comprises a first rotating body and a second rotating body that have the plural teeth;
wherein the plural teeth of the first rotating body and the plural teeth of the second rotating body are disposed alternating with each other in the circumferential direction of rotation of the spool;
wherein at least parts of the plural teeth of the first rotating body and at least parts of the plural teeth of the second rotating body are disposed overlapping each other in the circumferential direction of rotation of the spool; and
wherein the moving member is formed in the shape of a rod from a softer material than that of the rotating body, and the moving member is deformed when engaged with the plural teeth.

2. The webbing take-up device according to claim 1, wherein:
the phase of the plural teeth of the first rotating body and the phase of the plural teeth of the second rotating body are disposed shifted from each other in the circumferential direction of rotation of the spool, and
the regulating portion comprises a first regulating portion that regulates movement, toward the first rotating body, of the moving member engaged with the plural teeth of the second rotating body and a second regulating portion that regulates movement, toward the second rotating body, of the moving member engaged with the plural teeth of the first rotating body.

3. The webbing take-up device according to claim 2, wherein:
intervals between the teeth of the first rotating body and the teeth of the second rotating body adjacent to each other in the circumferential direction of rotation of the spool are set at equal intervals.

4. The webbing take-up device according to claim 2, wherein the shapes of the plural teeth of the first rotating body and the shapes of the plural teeth of the second rotating body are formed symmetrically across a line orthogonal to the axial direction of rotation of the spool.

* * * * *